(12) United States Patent
Talbot et al.

(10) Patent No.: US 8,789,307 B1
(45) Date of Patent: Jul. 29, 2014

(54) FISHING DEVICE WITH RELOCATEABLE WINGS

(71) Applicants: Don Talbot, Wenatchee, WA (US); Jesse Brazill, East Wentachee, WA (US)

(72) Inventors: Don Talbot, Wenatchee, WA (US); Jesse Brazill, East Wentachee, WA (US)

( * ) Notice: Subject to any disclaimer, the term of this patent is extended or adjusted under 35 U.S.C. 154(b) by 58 days.

(21) Appl. No.: 13/734,564

(22) Filed: Jan. 4, 2013

(51) Int. Cl.
*A01K 85/00* (2006.01)
*A01K 85/16* (2006.01)
*A01K 85/01* (2006.01)

(52) U.S. Cl.
CPC ............... *A01K 85/01* (2013.01); *A01K 85/00* (2013.01)
USPC .......................................... 43/42.09; 43/42.47

(58) Field of Classification Search
CPC ...................................................... A01K 85/16
USPC ........ 43/42, 42.09, 42.13, 42.5, 42.06, 42.35, 43/42.36, 42.03, 42.22, 42.47
See application file for complete search history.

(56) References Cited

U.S. PATENT DOCUMENTS

| | | | |
|---|---|---|---|
| 295,350 A | | 3/1884 | Chapman |
| 586,620 A | * | 7/1897 | Osborn ........................ 43/42.09 |
| 1,002,785 A | | 9/1911 | Telford |
| 1,457,926 A | * | 6/1923 | Dunkelberger ............... 43/42.09 |
| 1,989,850 A | | 2/1935 | Dorsey |
| 2,003,550 A | * | 6/1935 | Muller ........................ 43/42.36 |
| 2,494,384 A | * | 1/1950 | Gadzinski et al. ........... 43/42.22 |
| 2,497,807 A | | 2/1950 | Wood |
| 2,516,039 A | * | 7/1950 | Wysack ........................ 43/42.36 |
| 2,561,515 A | * | 7/1951 | Keeler ........................... 43/42.5 |
| 2,750,701 A | * | 6/1956 | Beames ........................ 43/42.09 |
| 2,835,999 A | | 5/1958 | Gillian |
| 2,871,610 A | * | 2/1959 | Welch ........................... 43/42.46 |
| 3,087,273 A | * | 4/1963 | Nurme ......................... 43/42.06 |
| 3,462,871 A | * | 8/1969 | McVay ........................ 43/42.47 |
| 3,494,063 A | | 2/1970 | Treaster |
| 3,541,718 A | * | 11/1970 | Norman ........................ 43/42.35 |
| 3,844,060 A | * | 10/1974 | Kurachi ............................ 43/41 |
| 3,858,344 A | * | 1/1975 | Watts ........................... 43/42.05 |
| 4,038,774 A | * | 8/1977 | Misiak ......................... 43/42.09 |
| 4,367,607 A | * | 1/1983 | Hedman ......................... 43/42.1 |
| 4,807,387 A | * | 2/1989 | Dougherty et al. ........... 43/42.09 |
| 5,177,895 A | * | 1/1993 | Baron ............................ 43/44.2 |
| 5,263,277 A | | 11/1993 | Kelly |
| 5,778,593 A | * | 7/1998 | Baron ............................... 43/41 |
| 6,101,758 A | * | 8/2000 | Finley ........................ 43/42.22 |
| 6,108,961 A | | 8/2000 | Milawski |
| 7,644,533 B2 | | 1/2010 | Hair, III et al. |
| 7,874,094 B2 | | 1/2011 | Brevig |
| 8,474,174 B2 | * | 7/2013 | Norman ........................ 43/42.06 |
| 2009/0193706 A1 | | 8/2009 | Brevig |

FOREIGN PATENT DOCUMENTS

JP 2000209981 8/2000

\* cited by examiner

*Primary Examiner* — Darren W Ark
*Assistant Examiner* — Danielle Clerkley
(74) *Attorney, Agent, or Firm* — Seattle Patent Group LLC (57) ABSTRACT

A fishing device which comprises a generally fish shaped housing and a wing. A mechanism is for removably attaching the wing in various positions to the housing to effect a predetermined motion when the housing is pulled through water. The housing includes a body portion having a compartment therein for holding bait, so that when the housing is pulled through the water scent of the bait will exit through vents to attract fish thereto.

3 Claims, 10 Drawing Sheets

FISHING DEVICE WITH RELOCATEABLE WINGS

BACKGROUND OF THE INVENTION

1. Field of the Invention

The present invention relates generally to fishing devices and, more specifically, to at least one wing that is releasably fastened to the device body having at least one wing receptacle.

The present invention further envisions fishing devices having a body incorporating a plurality of apertures for egress of scent or bait from said body.

Additionally provided is a cantilevered wing support extending transversely from a wing serving to resist wing deformation while moving through water.

Further provided is a body having at least one receptacle for bait and/or scents. The receptacle can be a compartment formed by sectioning the device body into separable portions providing access to said compartment for placement therein of said bait and/or scent. The separable portions device body further provides for a fastener for latching the two portions together thereby closing said compartment. Also provided is a device body having at least one receptacle with the body receptacle having separable portions that are hinged with the separable portions having bait fastening means for attaching a bait fish to the winged fish device.

2. Description of the Prior Art

There are other fishing lures which provide for releasable fishing lure attachments. While these fishing lures may be suitable for the purposes for which they where designed, they would not be as suitable for the purposes of the present invention as heretofore described.

It is thus desirable to provide at least one wing for a fishing device having a body incorporating at least one wing receptacle for releasably attaching said wing to said fishing device wherein said fishing device provides a plurality of various sized wings to effect a predetermined device body motion caused by said wing/wings while moving through water.

It is further desirable to provide a fishing device body having at least one device body receptacle for releasably attaching at least one wing thereto and wherein said body incorporates separable portions providing access to a receptacle for attachment of bait or scent to said device body.

SUMMARY OF THE PRESENT INVENTION

A primary object of the present invention is to provide a wing for a fishing device having a fishing device body with a wing receptacle to effect a predetermined motion while the fishing device moves through water.

Another object of the present invention is to provide a fishing device having a body with a plurality of wing receptacles whereby at least one of a plurality of various wing shapes can be releasably fastened to said fishing device body.

Yet another object of the present invention is to provide a plurality of various wing shapes that are attachable to the fishing device having at least one wing receptacle whereby a user can effect a plurality of device body motions by substituting one of said plurality of wing shapes.

Still yet another object of the present invention is to provide a plurality of wing shapes with each of said shapes further providing a transverse support extending from the back side of a wing to prevent deformation of the wing shape while moving through water.

Another object of the present invention is to provide a fishing device body having at least one wing receptacle with said device body having separable portion incorporating a receptacle for holding bait or scent with said device body.

Yet another object of the present invention is to provide a fishing device body having separable portion proving a fastener for holding the device body separable portions in a closed state.

Still yet another object of the present invention is to provide a fishing device body having separable portion that are hinged to the device body.

Another object of the present invention is to provide a fishing device body having receptacle gripping means for fixedly attaching bait to said device body.

Additional objects of the present invention will appear as the description proceeds.

The present invention overcomes the shortcomings of the prior art by providing a fishing device having at least one wing receptacle and at least one wing releasably attached within the device body wing receptacle and further provides for a device body having a plurality of device body wing receptacles and a plurality of wings having various shapes. The wings optionally provide for a wing support transversally extending from the back side of the wing forming support to prevent wing deformation while moving through water. Also provided is a body having at least one wing receptacle with said body incorporating a receptacle for bait and/or scents.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the Figures illustrate the fishing device of the present invention. With regard to the reference numerals used, the following numbering is used throughout the various drawing figures.

20 fishing device
22 housing of fishing device 20
24 wing of fishing device 20
26 leg portion of wing 24
28 centralized opening of wing 24
30 head portion of housing 22
32 body portion of housing 22
34 wing slot in head portion 30
35 water
36 first side of body portion 32
38 second side of body portion 32
40 hinge for second side 38
42 compartment in body portion 32
44 vent in body portion 32
46 latching mechanism of fishing device 20
48 rubber band for latching mechanism 46
50 tail portion of housing 22
52 attachable head sleeve of fishing device 20
54 mouth wing slot in attachable head sleeve 52
56 diving bill on attachable head sleeve 52
58 longitudinal tube in fishing device 20
60 fishing line through tube 58
62 fishing hook on fishing line 60
64 wire through tube 58

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
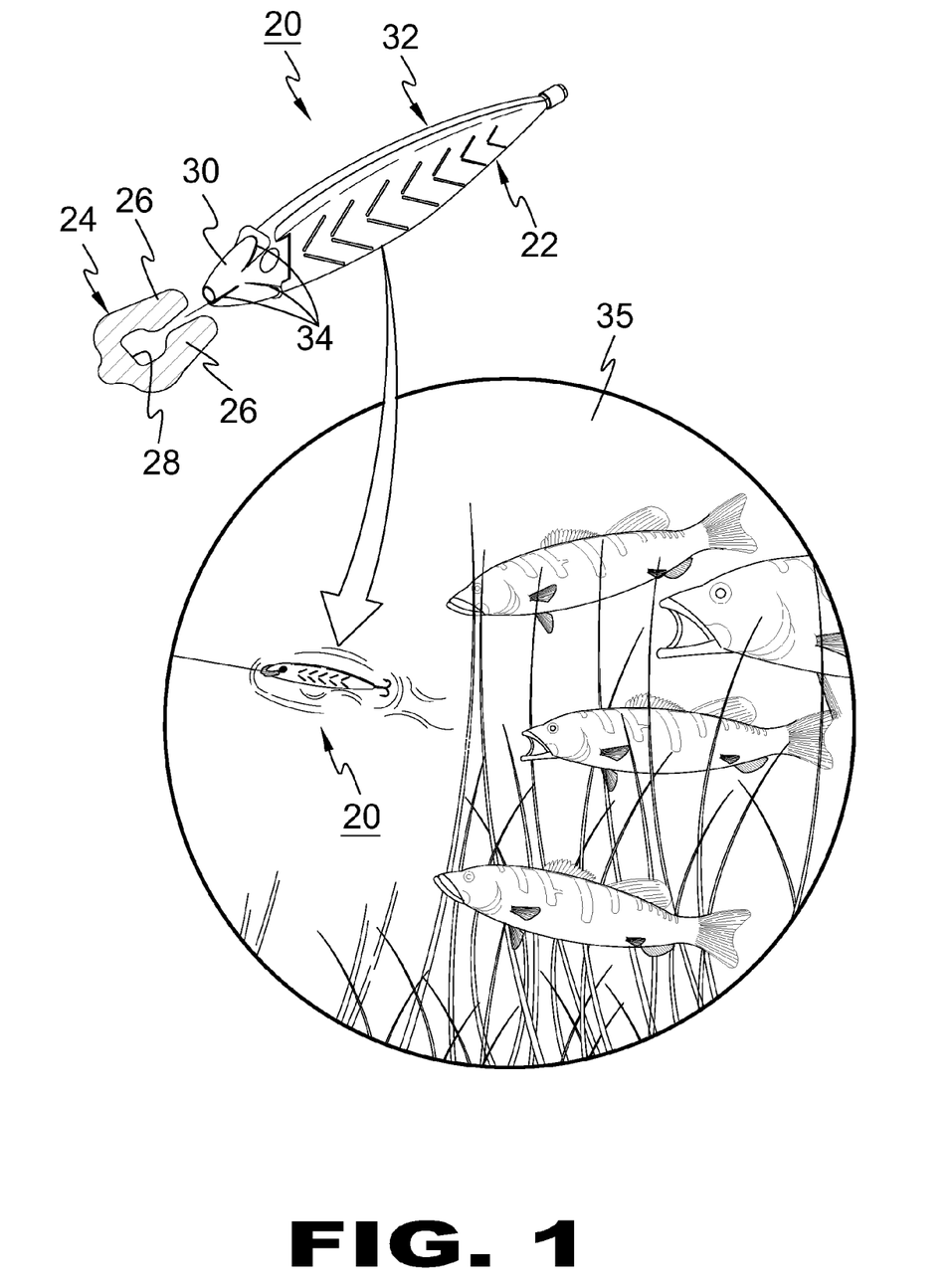
FIG. 1 is an illustrative view of the fishing device of the present invention in use.

Referring to FIG. 1, shown is an illustrative view of the fishing device of the present invention in use. The present invention is a fishing device 20 having a housing 22 and an attachable detachable pliable Mylar wing 24. The pliable Mylar wing 24 has a pair of opposing leg portions 26 encompassing a centralized opening 28. The housing 22 comprises a head portion 30 and a body portion 32 with the head portion 30 having a plurality of wing slots 34 for inserting each of the leg portions 26 into a respective wing slot 34 to produce a clockwise or counter clockwise rotation of the fishing device 20 while moving through water 35.

Figure 2:
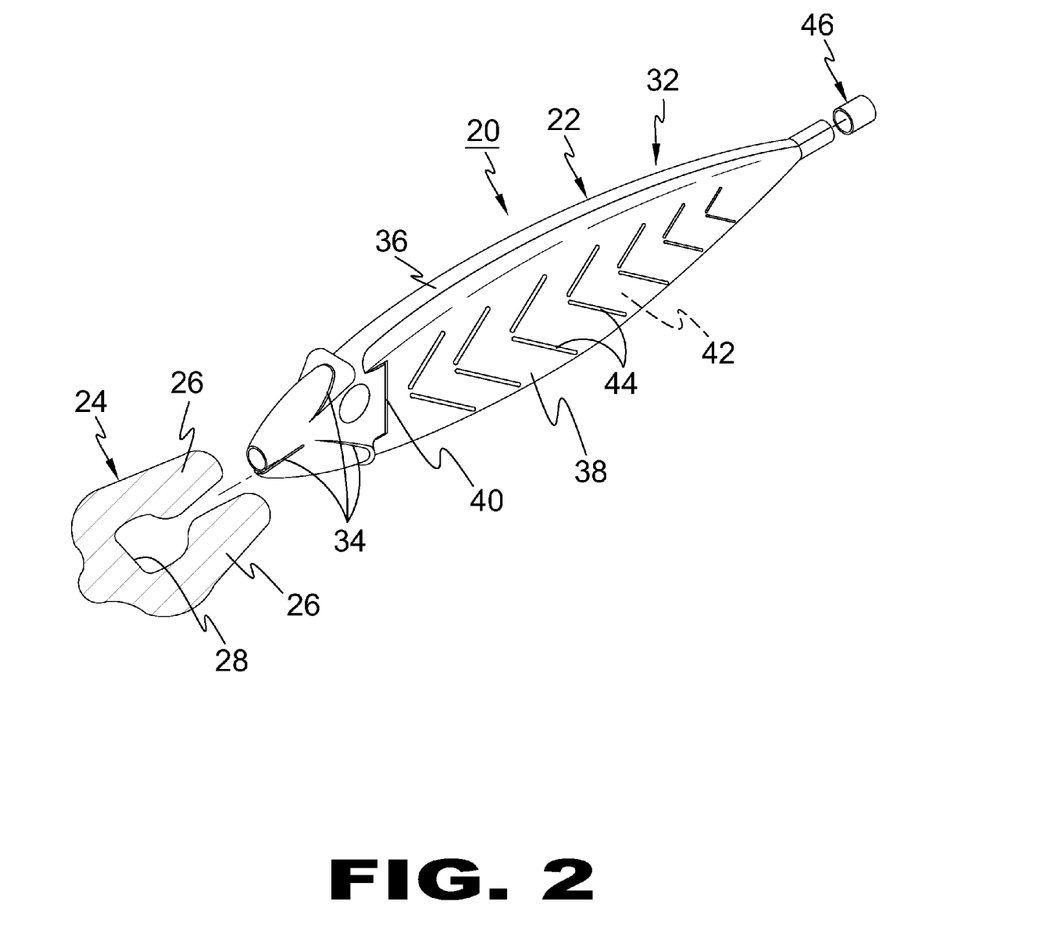
FIG. 2 is an exploded view of the fishing device of the present invention.

Referring to FIG. 2, shown is an exploded view of the fishing device of the present invention. Shown is the fishing device 20 having a housing 22 and a selectively positionable pliable Mylar wing 24. The housing 22 comprises a head portion 30 having a plurality of wing slots 34 to effect a desired rotation of the fishing device 20 depending on the positioning of the pliable wing 24. A body portion 32 is divided into a first side 36 and a second side 38 hinged at 40 to the head portion 30 with the sides 36,38 encompassing a compartment 42 for placement therein of bait and/or scents (not shown). A plurality of vents 44 extend along both sides 36,38 for dispensing the bait and/or scent(s) into the water 35. Also shown is a latching mechanism 46 for securing the sides 36,38 of the body portion 32 together.

Figure 3:
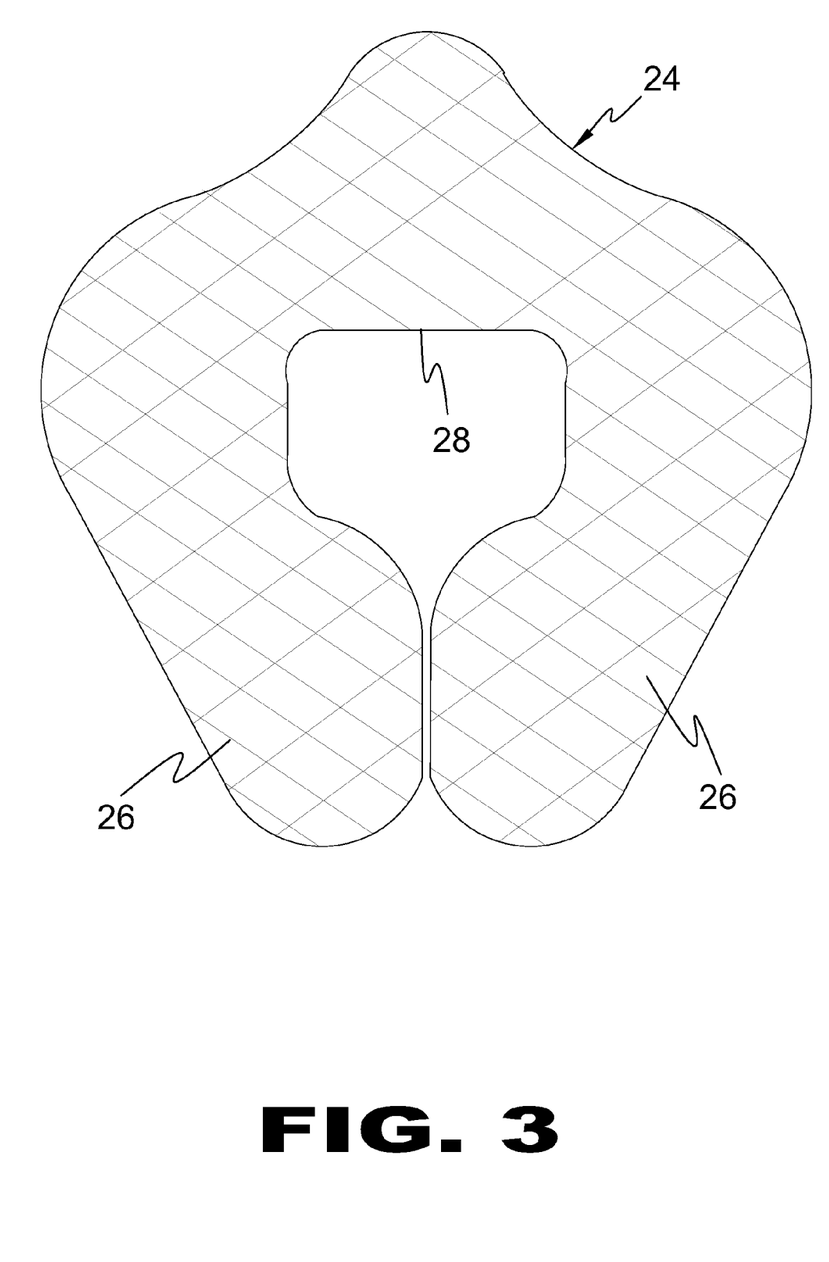
FIG. 3 is a front view of the pliable wing of the present invention.

Referring to FIG. 3, shown is a front view of the pliable wing of the present invention. The pliable Mylar wing 24 has a pair of opposing leg portions 26 that encompasses a centralized opening 28 which can be of any size. The purpose of the relocatable wing 24 is to provide the user with a choice of desired movements of the fishing device 20 as it moves through water 35 by placing the leg portions 26 in a respective wing slot 34.

Figure 4:
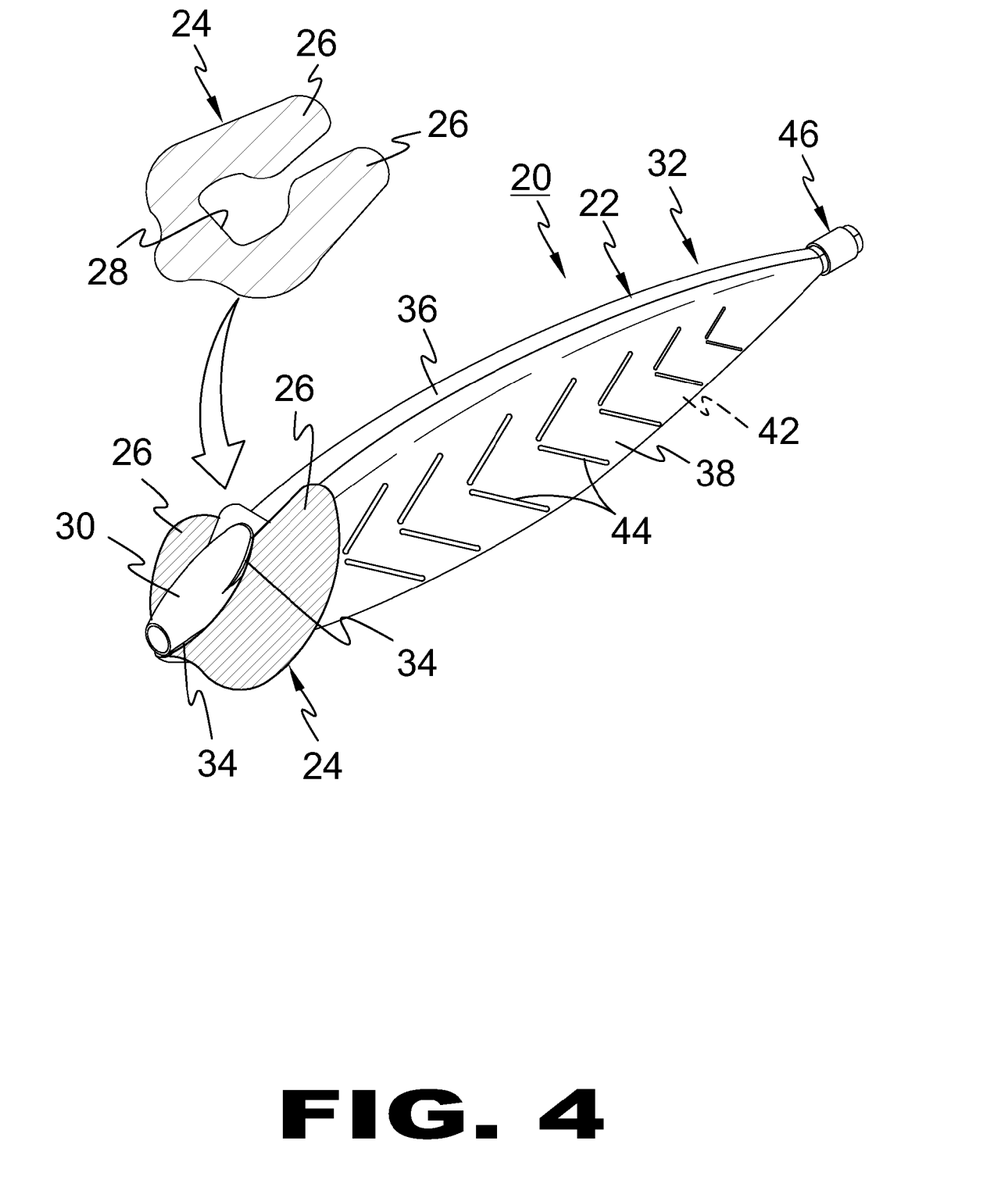
FIG. 4 is a perspective view of the present invention.

Referring to FIG. 4, shown is a perspective view of the present invention. Leg portions 26 on the Mylar wing 24 are inserted within the mouth slot 34 or upper and lower slots 34 located in the head portion 30 of the fishing device 20. The positioning of the Mylar wing 24 can vary according to the type of action the user desires.

Figure 5:
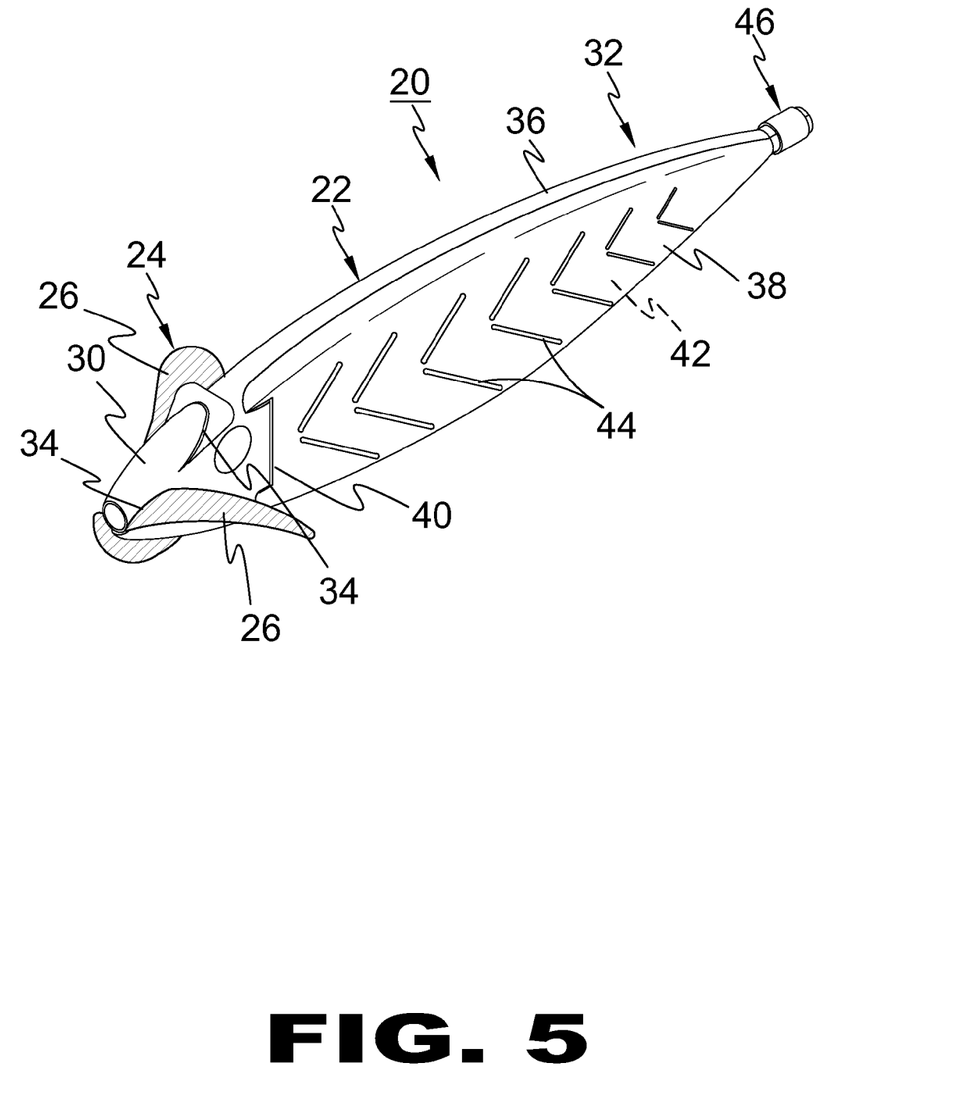
FIG. 5 is a perspective view of the present invention.

Referring to FIG. 5, shown is a perspective view of the present invention. Shown is another variation of placement of the Mylar wing 24. Leg portions 26 on the Mylar wing 24 are inserted within the mouth slot 34 or upper and lower slots 34 located in the head portion 30 of the fishing device 20. The positioning of the Mylar wing 24 can vary according to the type of action the user desires.

Figure 6:
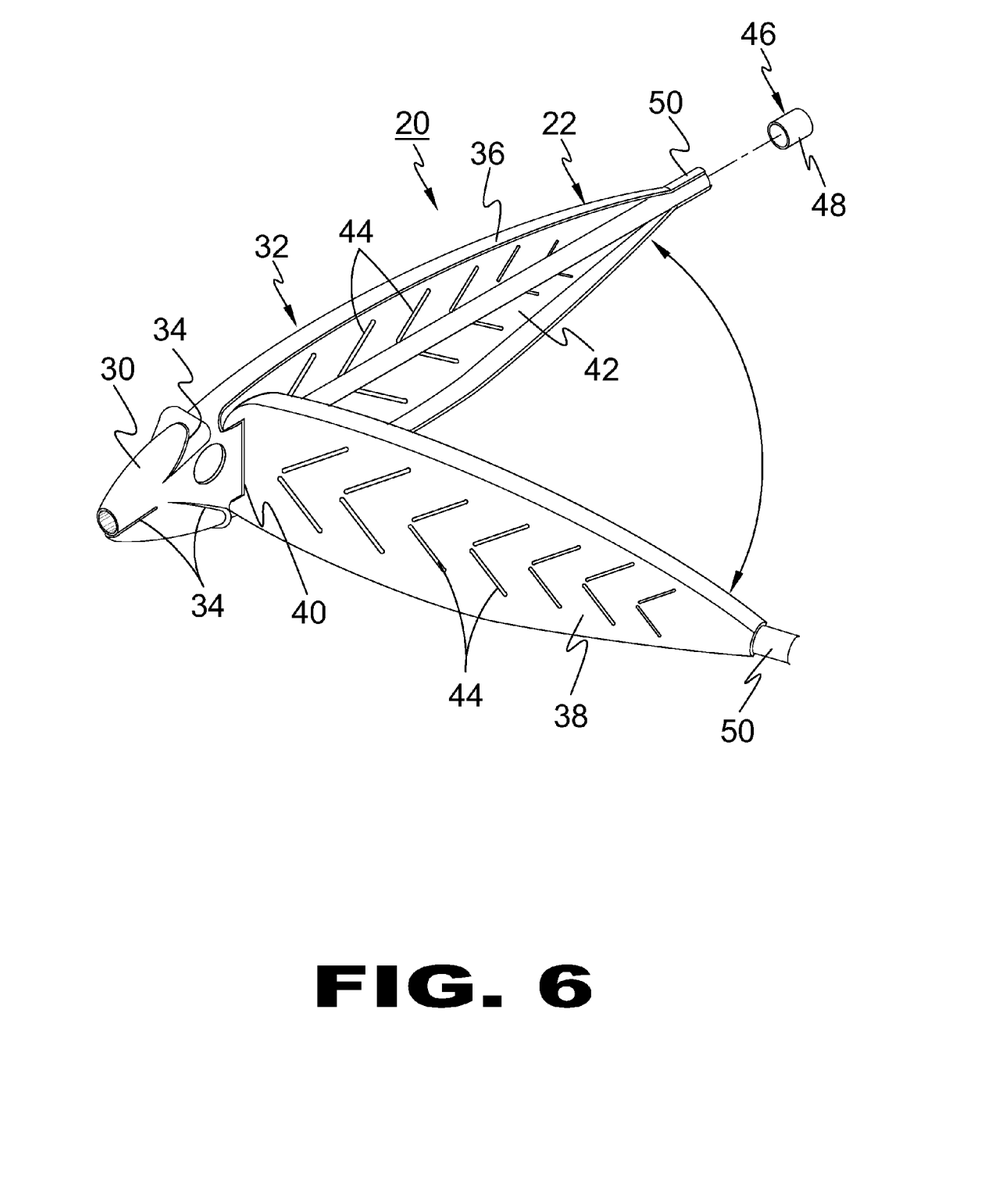
FIG. 6 is a perspective view of the present invention.

Referring to FIG. 6, shown is a perspective view of the present invention. The fishing device body portion 32 comprises a first side 36 and a second side 38 hinged at 40 that opens, allowing the user to insert bait or fish attractant within the compartment 42. The latching mechanism 46 is a rubber band 48 placed over a tail portion 50 of the housing 22 to secure it in a closed position.

Figure 7:
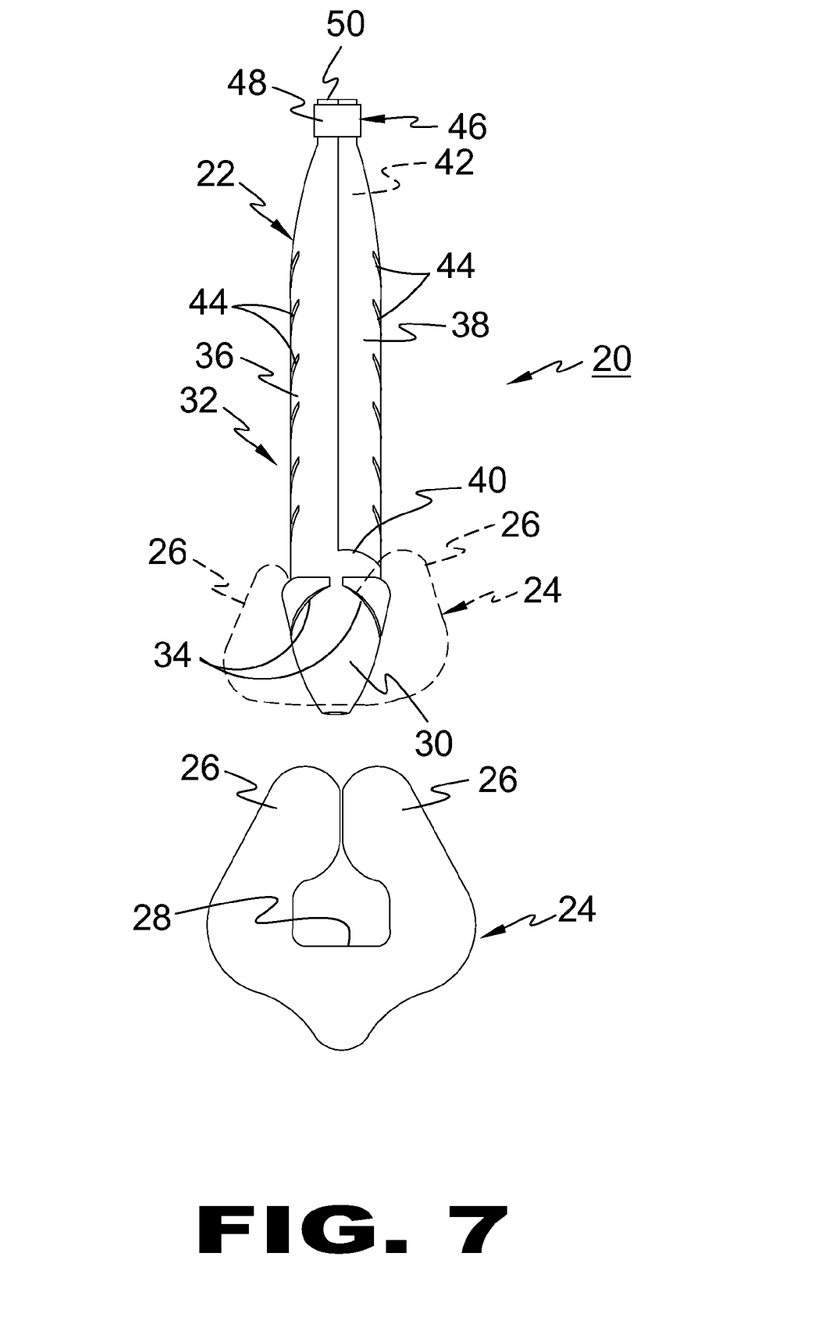
FIG. 7 is a top view of the present invention.

Referring to FIG. 7, shown is a top view of the present invention. Shown is a top view of the fishing device 20 of the present invention illustrating the positioning of the Mylar wing 24 within the wing slots 34.

Figure 8:
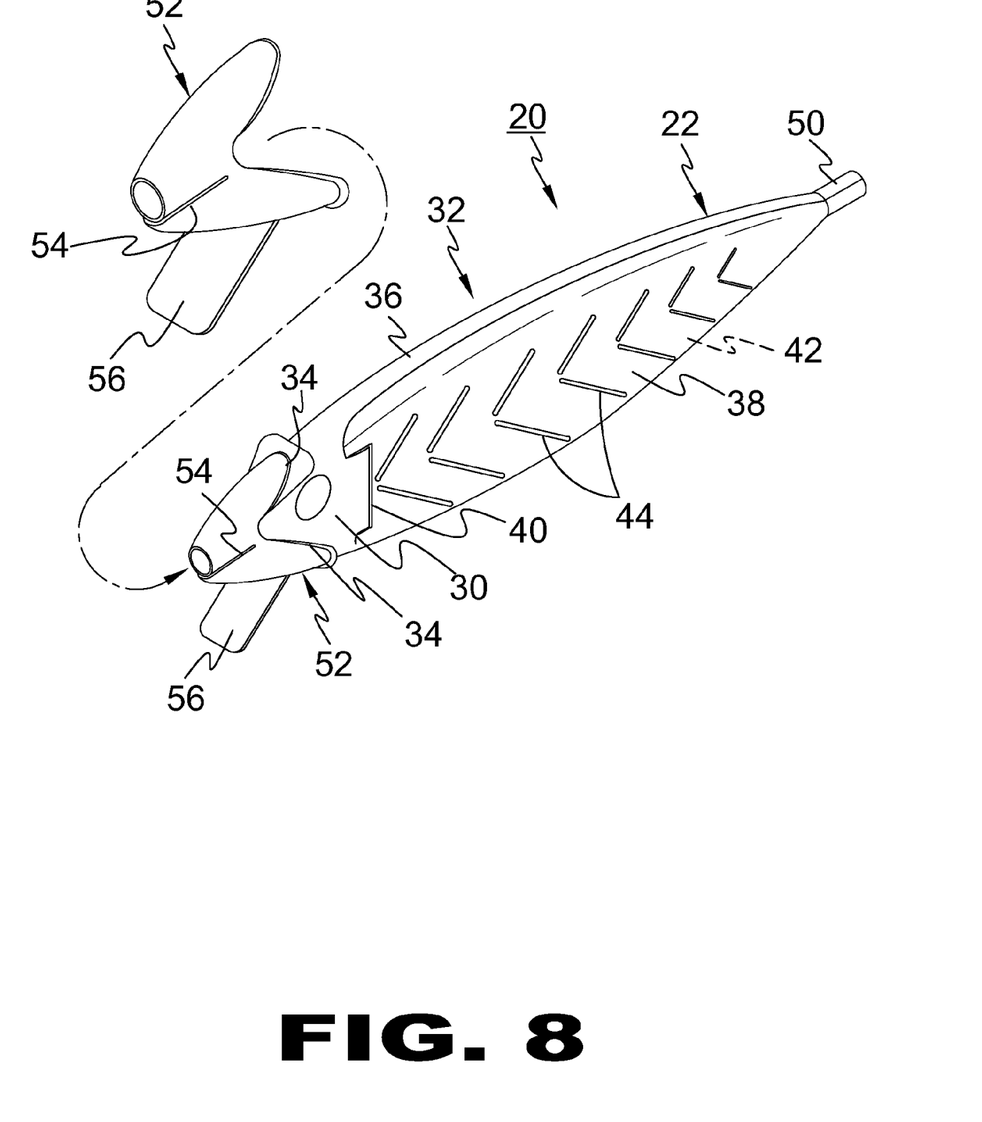
FIG. 8 is a perspective view of the present invention.

Referring to FIG. 8, shown is a perspective view of the present invention. Shown is a variation of the fishing device 20 having an attachable head sleeve 52 that snaps on the head portion 30. The attaching head portion sleeve 52 has a mouth slot 54 and a diving bill 56. The mouth wing slot 54 aligns up with the wing slot 34 in the head portion 30.

Figure 9:
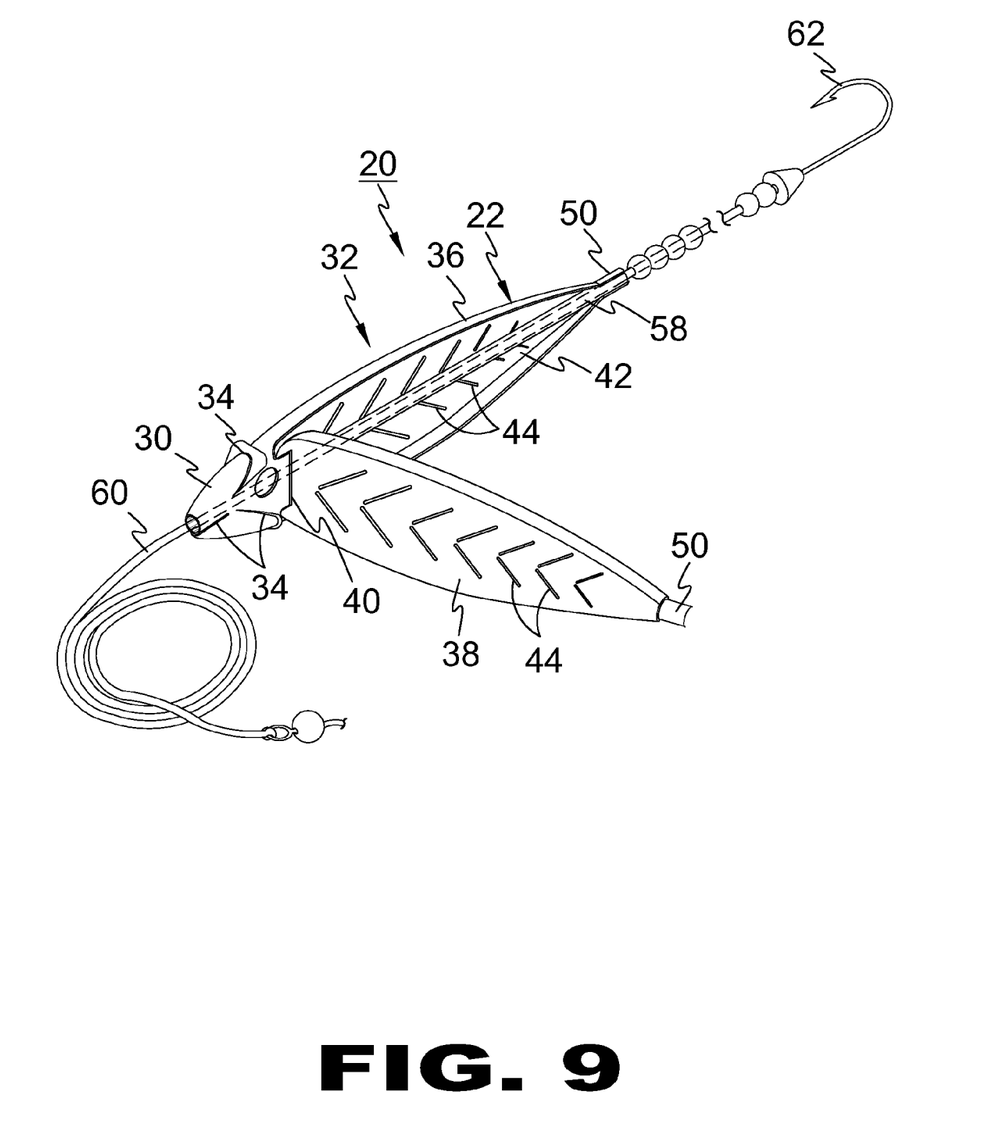
FIG. 9 is a perspective view of the present invention.

Referring to FIG. 9, shown is a perspective view of the present invention. The fishing device 20 comprises a longitudinal tube 58 that allows a fishing line 60 to slide through the tube 58 and attach to at least one fishing hook 62 thereby acting as a bait lure.

Figure 10:
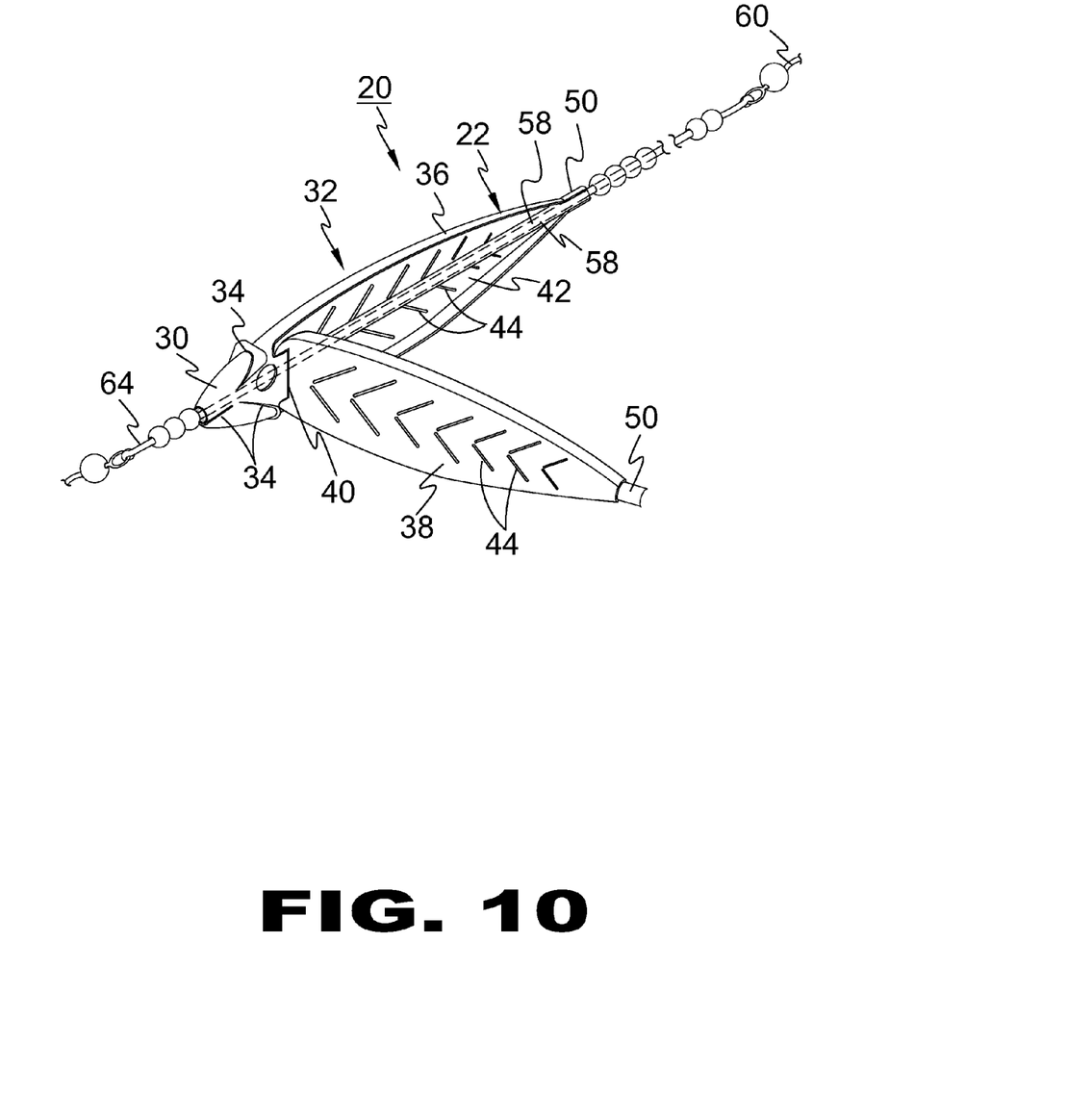
FIG. 10 is a perspective view of the present invention.

Referring to FIG. 10, shown is a perspective view of the fishing device of the present invention. The fishing device 20 contains a longitudinal tube 58 in which a wire 64 can slide through the tube 58. The wire 64 can attach to the fishing line 60 so that the fishing device 20 can act as a scent flasher.

What is claimed is new and desired to be protected by Letters Patent is set forth in the appended claims:

1. A fishing device which comprises:
   a) a generally fish shaped housing having a body portion, a head portion formed on a forward end of the body portion, the head portion having a plurality of wings slots, with each wing slot located in a mouth and upper and lower locations of the head portion and a short tubular tail portion formed on a rearward end of the body portion;
   b) a wing having a pair of leg portions with a centralized opening, whereby the leg portions are inserted and retained within any of the wing slots in the head portion; and
   c) an attachable head sleeve that snaps on the head portion of the housing, the head sleeve having a mouth wing slot that aligns-up with the mouth wing slot in the head portion and a diving bill formed on underside of the head sleeve to cause the housing to dive downwardly in the water when pulled forwardly.

2. The fishing device as recited m claim 1, wherein the body portion, comprises:

a) a first side having a plurality of vents affixed to the head portion;
b) a second side having a plurality of vents hinged to the head portion, whereby the first side and the second side form a compartment therebetween for holding bait therein; and
c) the short tubular tail being longitudinally split with a first segment extending rearwardly on the first side of the body portion and the second segment extending rearwardly on the second side of the body portion and a rubber band which fits over the first and second segments of the short tubular tail when the second side is in a closed position against the first side, the second side in a closed position against the first side, so that when the housing is pulled through the water, scent of the bait will exit through the vents in the first side and the second side of the body portion to attract fish thereto.

3. The fishing device as recited in claim 1, further comprising a longitudinal tube extending through the head portion, the body portion and the short tail portion, whereby in a first instance a fishing line slides through the tube and attaches to at least one fishing hook to act as a bait lure and in a second instance a wire slides through the tube and attaches to the fishing line to act as a scent flasher.

* * * * *